(12) United States Patent
Hayakawa

(10) Patent No.: US 11,590,971 B2
(45) Date of Patent: Feb. 28, 2023

(54) APPARATUS AND METHOD FOR DETERMINING TRAVELING POSITION OF VEHICLE

(71) Applicant: DENSO CORPORATION, Kariya (JP)

(72) Inventor: Tasuku Hayakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 17/030,854

(22) Filed: Sep. 24, 2020

(65) Prior Publication Data

US 2021/0009124 A1 Jan. 14, 2021

Related U.S. Application Data

(63) Continuation of application No. PCT/JP2019/002008, filed on Jan. 23, 2019.

(30) Foreign Application Priority Data

Mar. 26, 2018 (JP) .............................. JP2018-057341

(51) Int. Cl.
*B60W 30/12* (2020.01)
*G05D 1/02* (2020.01)
(Continued)

(52) U.S. Cl.
CPC ........... *B60W 30/12* (2013.01); *G05D 1/0214* (2013.01); *G06V 20/58* (2022.01); *G06V 20/588* (2022.01);
(Continued)

(58) Field of Classification Search
CPC ......... B60W 30/12; B60W 2050/0075; B60W 2520/06; B60W 2556/10; B60W 2554/00;
(Continued)

(56) References Cited

U.S. PATENT DOCUMENTS

2010/0256852 A1\* 10/2010 Mudalige ............... G08G 1/164
701/24
2016/0194003 A1 7/2016 Torii et al.
(Continued)

FOREIGN PATENT DOCUMENTS

JP 2011-162132 A 8/2011
JP 2011-242887 A 12/2011
(Continued)

*Primary Examiner* — Rodney A Butler
(74) *Attorney, Agent, or Firm* — Maschoff Brennan

(57) ABSTRACT

In an apparatus for determining a traveling position of an own vehicle that is an autonomous driving vehicle equipped with the apparatus, a judgment section is configured to judge presence or absence of at least one of a travel history of other vehicles regarding the lane in which the own vehicle is traveling and an object that is located in the vicinity of the own vehicle within the lane in which the own vehicle is traveling and should be avoided coming into contact with. The traveling position is a widthwise position of the own vehicle within a lane in which the own vehicle is traveling. A determination section is configured to determine the traveling position using the travel history in response to the judgment section judging that the travel history exists and using position information of the object in response to the judgment section judging that the object exists.

10 Claims, 10 Drawing Sheets

(51) Int. Cl.
  *G06V 20/58* (2022.01)
  *G06V 20/56* (2022.01)
  *B60W 50/00* (2006.01)

(52) U.S. Cl.
  CPC . *B60W 2050/0075* (2013.01); *B60W 2520/06* (2013.01); *B60W 2556/10* (2020.02); *G05D 2201/0213* (2013.01)

(58) Field of Classification Search
  CPC ......... G05D 1/0214; G05D 2201/0213; G06V 20/58; G06V 20/588; G08G 1/09; G08G 1/16
  See application file for complete search history.

(56) References Cited

U.S. PATENT DOCUMENTS

| | | |
|---|---|---|
| 2016/0339910 A1 | 11/2016 | Jonasson et al. |
| 2017/0096139 A1 | 4/2017 | Christensen et al. |
| 2017/0166254 A1 | 6/2017 | Katoh |

FOREIGN PATENT DOCUMENTS

| | | |
|---|---|---|
| JP | 2012-225683 A | 11/2012 |
| JP | 2014-43156 A | 3/2014 |
| JP | 2017-204145 A | 11/2017 |
| JP | 2018-7077 A | 1/2018 |

* cited by examiner

APPARATUS AND METHOD FOR DETERMINING TRAVELING POSITION OF VEHICLE

CROSS-REFERENCE TO RELATED APPLICATION

This application is based on and claims the benefit of priority from earlier Japanese Patent Application No. 2018-57341 filed Mar. 26, 2018, the description of which is incorporated herein by reference.

BACKGROUND

Technical Field

The present disclosure relates to an apparatus and a method for determining a traveling position of an own vehicle.

Related Art

A technique is known for preventing hindrances to a traffic environment around an own vehicle by controlling traveling in accordance with the traffic environment around the own vehicle in performing autonomous driving or self-driving of the own vehicle. More specifically, in performing autonomous driving control that causes the own vehicle to follow the road on which the own vehicle is currently traveling, autonomous driving control performed by an autonomous driving apparatus includes detecting a state of a lane in which the own vehicle is traveling and performing the autonomous driving control based on the detected state of the lane. For example, despite there being a road-following lane that allows road-following traveling on the road on which the own vehicle is traveling, if the own vehicle is traveling in the lane that is not the road-following lane, a course that moves the own vehicle to the road-following lane is generated. If there are multiple road-following lanes on the road on which the own vehicle is traveling, a course that moves the own vehicle to the road-following lane that is suitable for the road-following traveling is generated.

DESCRIPTION OF SPECIFIC EMBODIMENTS

Figure 1:
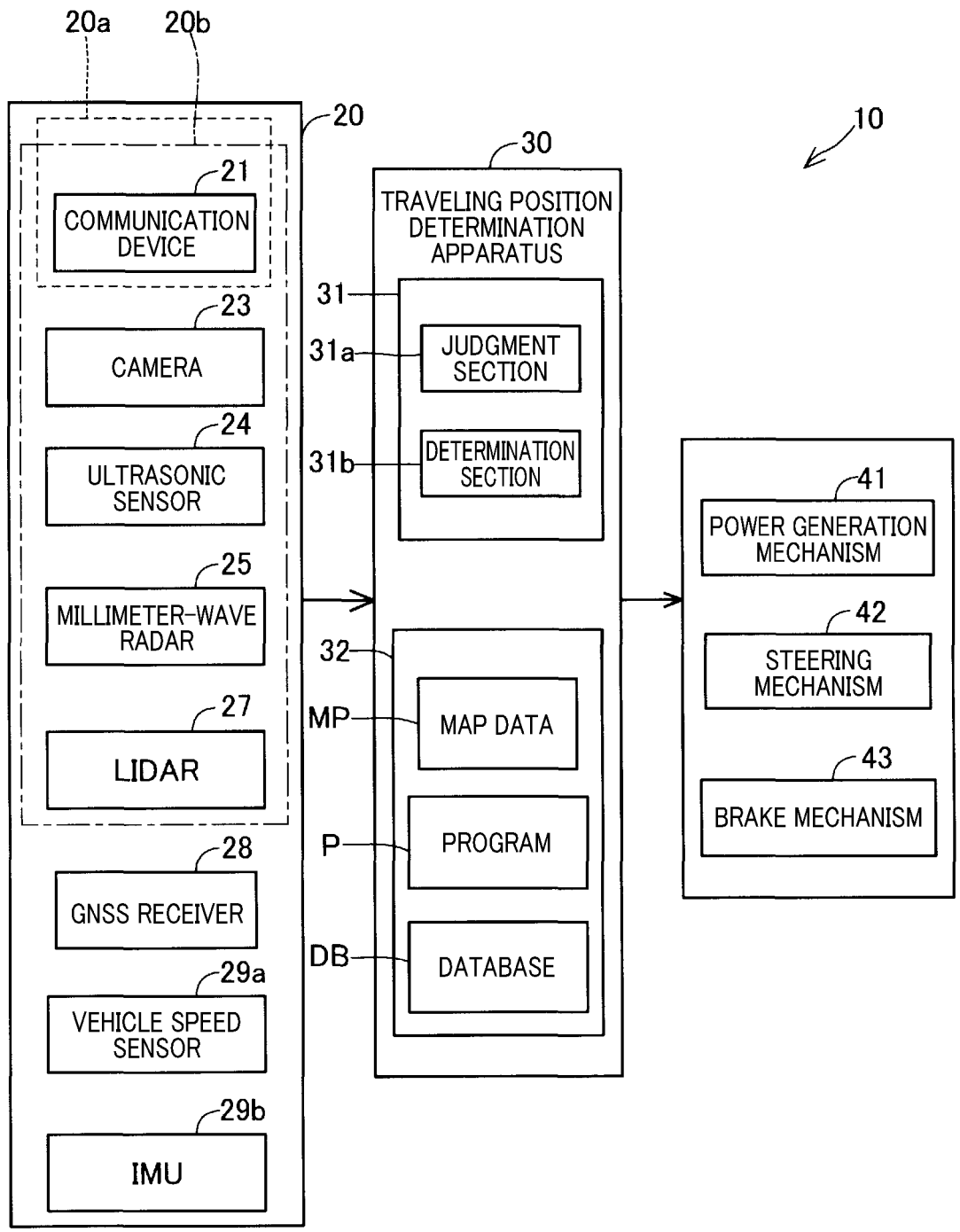
FIG. 1 is a block diagram illustrating the internal configuration of an autonomous driving vehicle.

The above-described known technique, as disclosed in JP-A-2011-162132, only selects the lane and does not consider controlling the position within the lane.

In view of the foregoing, it is desired to have a technique for determining the widthwise position of the own vehicle within a lane in a suitable manner. One aspect of the present disclosure provides an apparatus for determining a traveling position of an own vehicle that is an autonomous driving vehicle equipped with the apparatus, where the traveling position is a widthwise position within a lane. In the apparatus, a judgment section is configured to judge presence or absence of at least one of a travel history of other vehicles regarding the lane in which the own vehicle is traveling and an object that is located in the vicinity of the own vehicle within the lane in which the own vehicle is traveling and should be avoided coming into contact with. A determination section is configured to determine the traveling position using the travel history in response to the judgment section judging that the travel history exists and using position information of the object in response to the judgment section judging that the object exists. According to this aspect, since the traveling position is determined based on at least one of the travel history and the object, the traveling position is determined in a suitable manner.

Hereinafter, exemplary embodiments of the present disclosure will be described in detail with reference to the accompanying drawings, in which like reference numerals refer to like or similar elements regardless of reference numerals and duplicated description thereof will be omitted.

An autonomous driving vehicle 10 illustrated in FIG. 1 includes an autonomous driving function of levels 2 to 4. The autonomous driving vehicle includes information acquisition devices 20, a traveling position determination apparatus 30, a power generation mechanism 41, a steering mechanism 42, and a brake mechanism 43. The information acquisition devices 20 include a communication device 21, a camera 23, an ultrasonic sensor 24, a millimeter-wave radar 25, a LIDAR 27, a GNSS receiver 28, a vehicle speed sensor 29a, and an IMU 29b. The pieces of information acquired by the elements included in the information acquisition devices 20 are input to the traveling position determination apparatus 30. As will be discussed below, the communication device 21 functions as an acquisition section 20a, which acquires the travel history. The communication device 21, the camera 23, the ultrasonic sensor 24, the millimeter-wave radar 25, and the LIDAR 27 function as a detection section 20b, which detects the presence or absence of an object that is located in a traveling lane and should be avoided coming into contact with.

The communication device 21 performs vehicle-to-vehicle communication and road-to-vehicle communication. The road-to-vehicle communication is performed to communicate with an external device that collects and manages the travel history. The travel history will be described below.

The GNSS receiver 28 measures the longitude and the latitude as the current position of the autonomous driving vehicle 10 based on navigation signals received from navigation satellites. The IMU 29b is an inertial measurement unit and is a device that detects, for example, the angles of three axes, the angular velocity, and the acceleration.

The camera 23 is a camera that takes images of the surroundings of the autonomous driving vehicle 10. The camera 23 may be a monocular camera or a stereo camera. The ultrasonic sensor 24 is a distance-measuring device that uses ultrasonic waves. The millimeter-wave radar 25 is a radar that uses a millimeter-wave band. The LIDAR 27 is a distance-measuring device that uses a laser. The imaging range of the camera 23 of the present embodiment and the sensing range of the ultrasonic sensor 24, the millimeter-wave radar 25, and the LIDAR 27 are both 360 degrees, that is, all directions in the horizontal direction are covered. Each of the camera 23, the ultrasonic sensor 24, the millimeter-wave radar 25, and the LIDAR 27 may be formed of a single module or multiple modules. When each of the above elements is formed of multiple modules, even if the imaging range or the sensing range of a single module is less than 360 degrees, the elements complement each other and cover 360 degrees as the overall range.

The power generation mechanism (or the powertrain) 41 is formed of at least one of an internal combustion engine and an electric motor. The steering mechanism 42 is a mechanism for steering at least either the front wheels or the rear wheels of the autonomous driving vehicle 10. The brake mechanism 43 is a mechanism for decelerating the autonomous driving vehicle 10.

The traveling position determination apparatus 30 is formed of one or more ECUs. The traveling position determination apparatus 30 includes a CPU 31 and a storage medium 32. The storage medium 32 is formed of, for example, a non-transitory tangible storage medium, such as a semiconductor memory.

The storage medium 32 stores map data MP, a database DB, and a program P. The map data MP is used for planning a traveling path when autonomous driving is performed. As used herein, the traveling path is information indicating which road to travel in order to reach a destination and differs from a traveling position described later. The program P is a program for conducting a traveling position determination process described later. The CPU 31 functions as a judgment section 31a and a determination section 31b by performing the traveling position determination process. The relationship of the judgment section 31a and the determination section 31b with each step of the traveling position determination process will be described after the description of the embodiment.

The database DB stores the history of the traveling position. The traveling position as used in the present embodiment refers to the position along which the center of the vehicle moved. The traveling position determination apparatus 30 detects traveling position information indicating the center position of the autonomous driving vehicle 10 using a self-position estimation result, which is based on the measurement result of the GNSS receiver 28, the measurement result of the vehicle speed sensor 29a, and the detection result of the IMU 29b, and periodically transmits the traveling position information to the above-mentioned external device through the communication device 21. The method for estimating the self-position may include estimating by matching with a high-accuracy map using external sensors (such as the camera 23 and the LIDAR 27) included in the detection section 20b. The traveling position in the present embodiment is defined by sufficiently small points with respect to the width of the lane. Thus, the traveling position represents the widthwise position within the lane. The series of the traveling positions form the travel history.

Transmission of such traveling position information is performed not only by the autonomous driving vehicle 10 but also by many vehicles that are capable of acquiring the traveling position and have a function of communicating with the external device. Such vehicles include, in addition to autonomous driving vehicles similar to the autonomous driving vehicle 10, vehicles having an autonomous driving function of level 2 or less and vehicles having no autonomous driving function. Hereinafter, vehicles that transmit the traveling position information are collectively called information transmission vehicles. Hereinafter, the autonomous driving vehicle 10 and autonomous driving vehicles similar to the autonomous driving vehicle 10 are collectively called target vehicles. Furthermore, the traveling position information is also transmitted by a road-side device. The road-side device is located on a road as a communication device for performing road-to-vehicle communication with vehicles. The road-side device acquires the traveling position information through road-to-vehicle communication and transmits the traveling position information to the external device. The road-side device may include a sensing function. Sensors provided on the road-side device may be selected from, for example, a camera, a Lidar, and a millimeter-wave radar.

The external device performs a statistical process such as averaging on the acquired traveling position information to create a database of the traveling position. The external device classifies the traveling positions in the vicinity of the intersection per the traveling path in the database. For example, in the case of a crossroad, the external device classifies the traveling positions acquired from the target vehicles into three patterns including making a left turn, going straight ahead, and making a right turn and performs a statistical process on each pattern. The result of each statistical process is associated with the corresponding one of making a left turn, going straight ahead, and making a right turn and is stored in the database.

The external device transmits the created database to the target vehicles. The traveling position determination apparatus 30 stores the received database as the database DB in the storage medium 32.

Even after distributing the database to the target vehicles as described above, the external device continues to acquire the traveling position information from the information transmission vehicles and updates the database by performing the statistical process on the traveling position information including the information of the existing database. The external device periodically transmits the updated database to the target vehicles. The traveling position determination apparatus 30 updates the database DB to be stored in the storage medium 32 every time the database is received from the external device.

Figure 2:
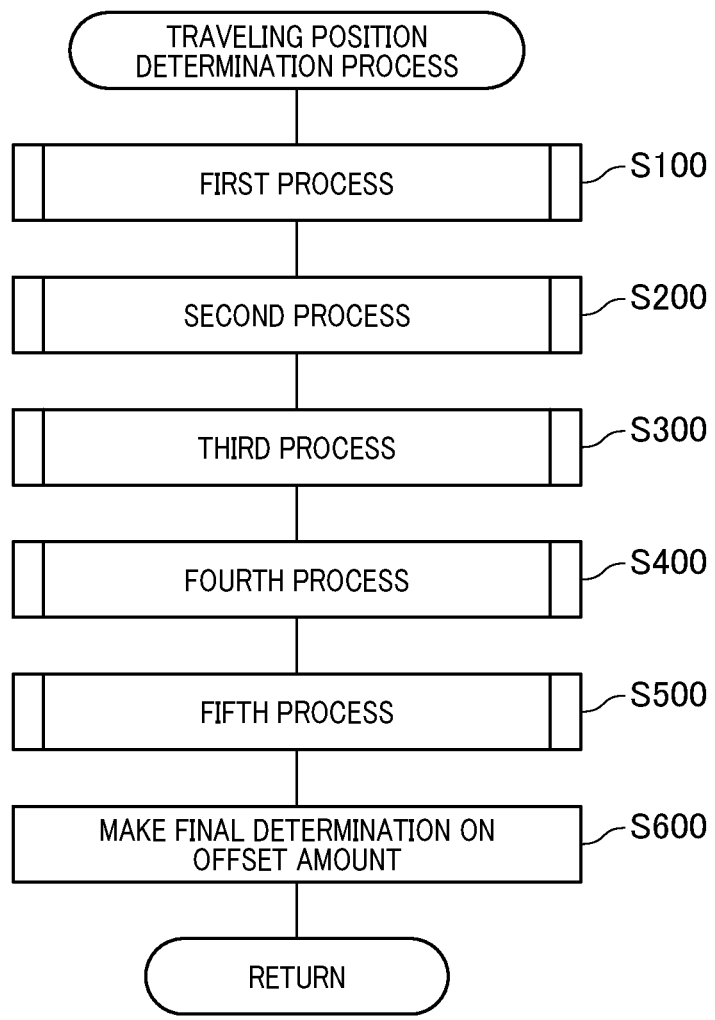
FIG. 2 is a flowchart of a traveling position determination process.

The CPU 31 repeatedly performs the traveling position determination process illustrated in FIG. 2. Hereinafter, the autonomous driving vehicle 10 is also referred to as the own vehicle 10 as required.

Figure 3:
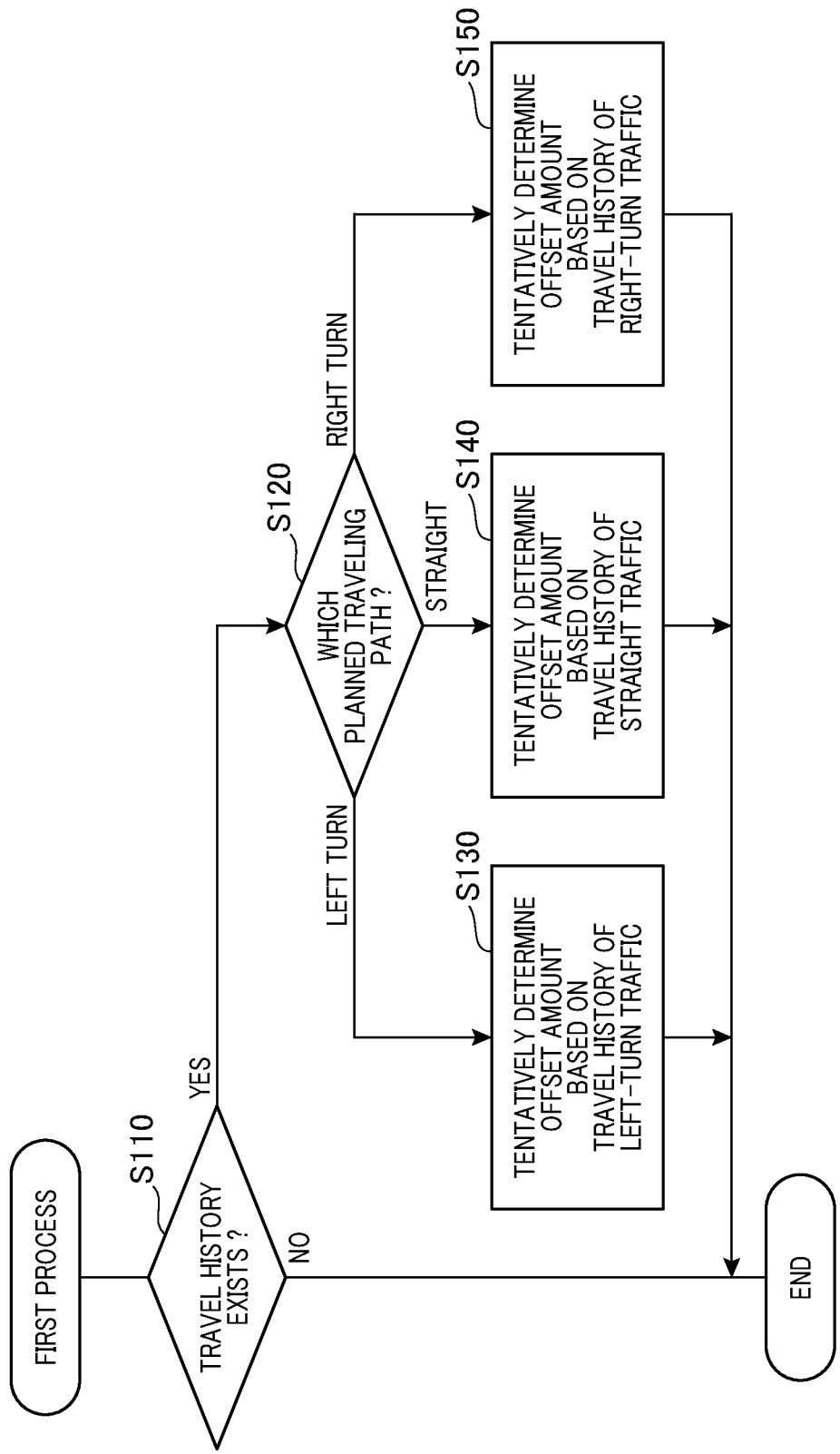
FIG. 3 is a flowchart of a first process related to a travel history.

The CPU 31 first proceeds to step S100 and performs a first process illustrated in FIG. 3. The CPU 31 proceeds to step S110 and judges whether the travel history in the vicinity of the current location is included in the database DB. If the travel history in the vicinity of the current location is not included, the decision outcome of step S110 is negative, and the CPU 31 terminates the first process.

If the travel history in the vicinity of the current location is included, the decision outcome of step S110 is positive, and the CPU 31 proceeds to step S120. At step S120, the CPU 31 judges a planned traveling path of the own vehicle 10. If the planned traveling path is a left turn, the CPU 31 proceeds to step S130, tentatively determines an offset (or displacement) amount based on the travel history of left-turn traffic, and terminates the first process. The phrase that "the planned traveling path is a left turn" means that the traveling distance from the current location to a position where the vehicle plans to make a left turn is within a predetermined distance. The same applies to the case of a right turn.

Even if the offset amount is tentatively determined, it does not mean that the traveling control in accordance with that offset amount is immediately performed. The final determination on the offset amount is made in step S600 described later.

Figure 4:
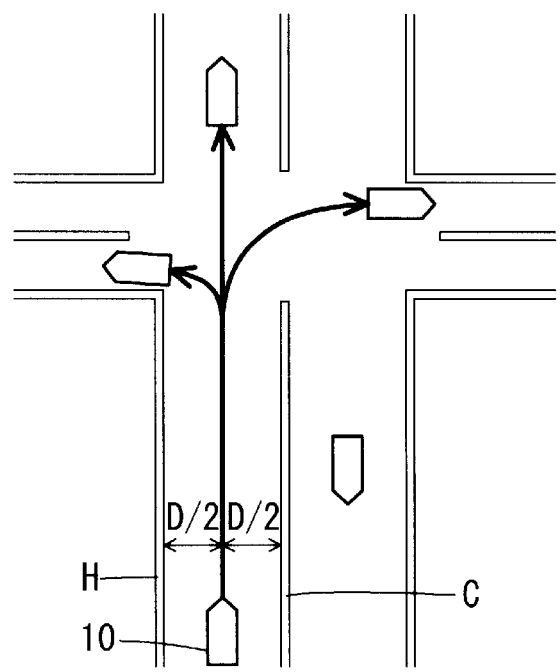
FIG. 4 is an illustration of a reference position in the vicinity of an intersection.

The reference position, which serves as the reference for the offset amount, will be described using FIG. 4. FIG. 4 illustrates the path approaching the intersection and the path leaving the intersection. The case of making a left turn, the case of going straight ahead, and the case of making a right turn are shown as the paths leaving the intersection. As illustrated in FIG. 4, in the present embodiment, the case of left-hand traffic will be described as an example. For right-hand traffic, the details understood by replacing the left and right in the embodiment may be implemented.

As illustrated in FIG. 4, the reference position is the center of the lane. That is, when the own vehicle 10 travels along the reference position, the own vehicle 10 travels in the center of the lane. FIG. 4 illustrates a case in which the width of the lane is D in the path approaching the intersection. Thus, the distance from the centerline C, which is the right edge of the lane, to the vehicle center is D/2, and the distance from an edge line H which is the left edge of the lane to the vehicle center is also D/2.

Figure 5:
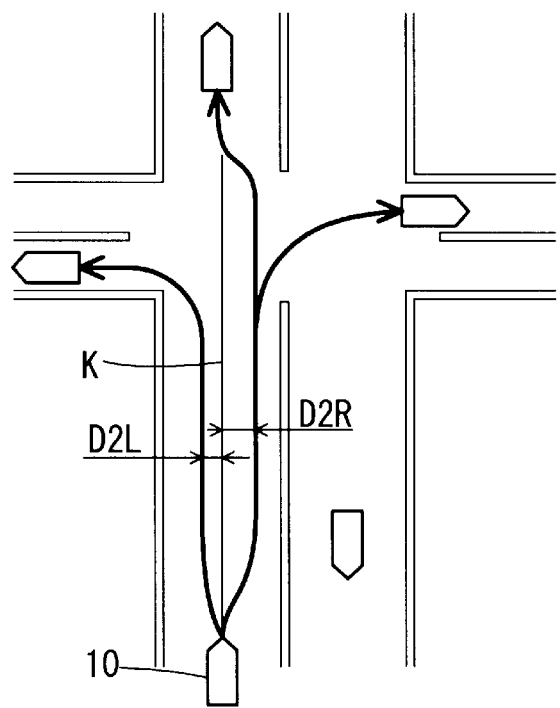
FIG. 5 is an illustration of an offset amount based on the travel history.

The offset amount is defined as the distance from the reference position K to the vehicle center as illustrated in FIG. 5. FIG. 5 illustrates a distance D2L as the offset amount before entering the intersection during a left turn. The distance D2L is the offset amount to the left from the reference position. That is, at step S130, the distance D2L is tentatively determined as the offset amount to the left from the reference position.

The position that is shifted from the reference position K is tentatively determined as the traveling position before entering the intersection as described above because the width of the lane illustrated in FIG. 5 substantially corresponds to the width of two lanes, and many information transmission vehicles drove closer to the left to prepare for a left turn before entering the intersection.

If the planned traveling path of the own vehicle 10 is straight, the CPU 31 proceeds to step S140, tentatively determines the offset amount based on the travel history of straight traffic, and terminates the first process. At the intersection, the distance D2R is associated as the offset amount of the case of going straight ahead and the case of making a right turn. The distance D2R is an offset amount to the right from the reference position K. Thus, if the planned traveling path of the own vehicle 10 is straight, the distance D2R is tentatively determined as the offset amount to the right from the reference position. The offset amount to the right is tentatively determined in the case of going straight ahead because many information transmission vehicles attempted to avoid a vehicle making a left turn.

Similarly, if the planned traveling path of the own vehicle 10 is a right turn, the CPU 31 proceeds to step S150, tentatively determines the distance D2R as the offset amount to the right from the reference position K, and terminates the first process. In the case of a right turn, the offset amount to the right is tentatively determined because many information transmission vehicles drove closer to the right to prepare for a right turn before entering the intersection. Note that the offset amount does not necessarily have to be the same between the case of going straight ahead and the case of making a right turn, and the offset amount may differ.

When the first process is terminated, the CPU 31 performs a second process as illustrated in FIG. 2. The second process is a process for judging whether to allow a succeeding vehicle 10k to overtake, and when allowing the overtaking, the CPU 31 tentatively determines the offset amount toward a road shoulder. When not allowing the overtaking, the CPU 31 does not tentatively determine the offset amount.

Figure 6:
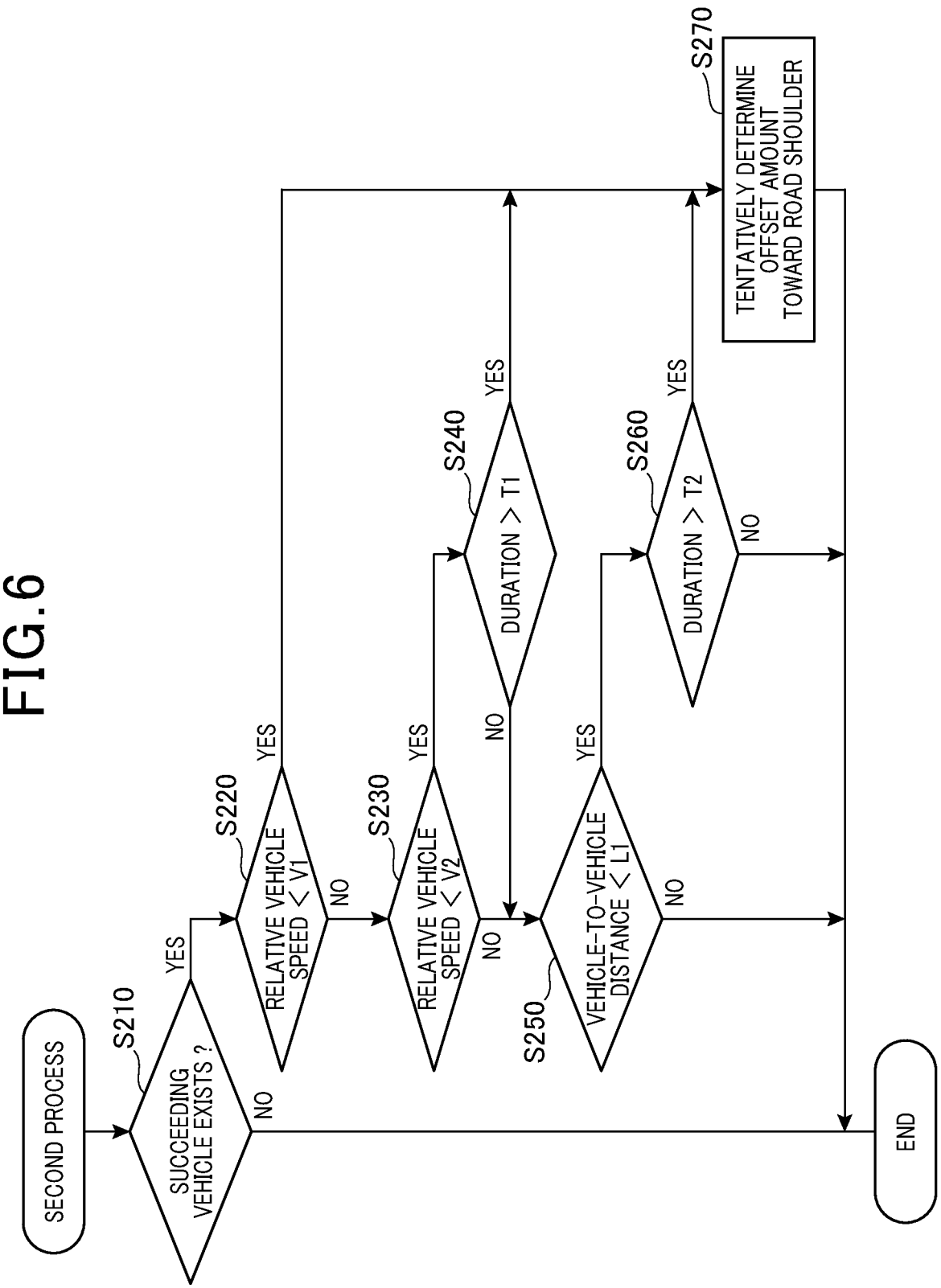
FIG. 6 is a flowchart of a second process related to a succeeding vehicle.
Figure 7:
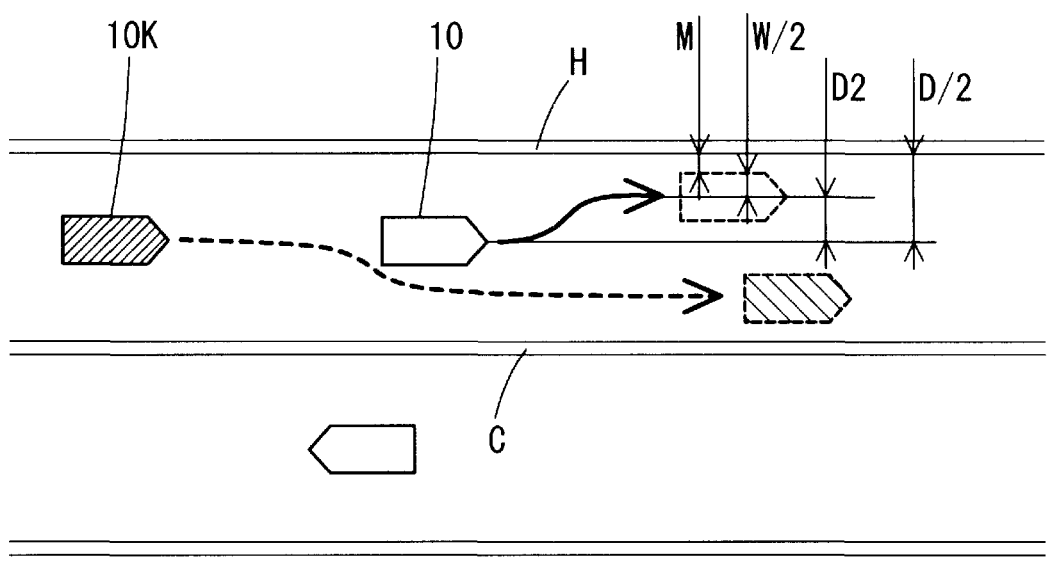
FIG. 7 is an illustration of an offset amount when there is a succeeding vehicle.

As illustrated in FIG. 6, when the second process is started, the CPU 31 proceeds to step S210 and judges whether there is a succeeding vehicle 10k. The succeeding vehicle 10k is illustrated in FIG. 7. The succeeding vehicle 10k refers to a vehicle that is traveling in the same lane as the own vehicle 10 and behind the own vehicle 10, and the distance to the own vehicle 10 is less than a distance L2. The distance L2 is greater than a distance L1 described later.

In the present embodiment, the presence or absence of the succeeding vehicle 10k and the vehicle-to-vehicle distance are judged based on at least one of pieces of information acquired by the vehicle-to-vehicle communication, the road-to-vehicle communication, the camera 23, the ultrasonic sensor 24, the millimeter-wave radar 25, and the LIDAR 27. Hereinafter, at least one of the pieces of information will also be referred to as the detection result of the detection section 20b. In the present embodiment, the detection result of the detection section 20b refers to all the above-described pieces of information. In other embodiments, only one or some of all the above-described pieces of information need to be used. If no succeeding vehicle 10k exists, the decision outcome of step S210 is negative, and the CPU 31 terminates the second process.

If the succeeding vehicle 10k exists, the decision outcome of step S210 is positive, and the CPU 31 proceeds to step S220. At step S220, the CPU 31 judges whether the relative vehicle speed is less than a speed V1. In the present embodiment, the relative vehicle speed is defined as a value obtained by subtracting the vehicle speed of another vehicle from the vehicle speed of the own vehicle 10. The vehicle speed of the succeeding vehicle 10k is acquired based on the detection result of the detection section 20b.

The speed V1 is a negative value. That is, if the relative vehicle speed is less than the speed V1, the vehicle speed of the succeeding vehicle is faster than the vehicle speed of the own vehicle 10, and the absolute value of the relative vehicle speed is greater than the absolute value of the speed V1.

If the relative vehicle speed is less than the speed V1, the decision outcome of step S220 is positive, and the CPU 31 proceeds to step S270. At step S270, the CPU 31 tentatively determines the distance D2 as the offset amount toward the road shoulder as illustrated in FIG. 7 and terminates the second process. The distance D2 is determined by the following Equation (1).

$$D2 = D/2 - W/2 - M \quad (1)$$

W is the vehicle width of the own vehicle 10. Thus, W/2 is half the vehicle width. M is a distance previously determined as a margin to the outer edge line H that defines the lane. The distance D2 determined by Equation (1) is determined so that the distance between the vehicle body of the own vehicle 10 and the edge line H closer to the road shoulder becomes equal to the margin M.

If the relative vehicle speed is greater than or equal to the speed V1, the decision outcome of step S220 is negative, and the CPU 31 proceeds to step S230. At step S230, the CPU 31 judges whether the relative vehicle speed is less than a speed V2. The speed V2 is a negative value. The absolute value of the speed V2 is less than the absolute value of the speed V1.

If the relative vehicle speed is less than the speed V2, the decision outcome of step S230 is positive, and the CPU 31 proceeds to step S240. At step S240, the CPU 31 judges whether a duration that the relative vehicle speed is greater than or equal to V1 and less than V2 (V1≤relative vehicle speed<V2) is greater than a predetermined duration T1. If the duration is greater than T1, the decision outcome of step S240 is positive, and the CPU 31 proceeds to step S270.

If the relative vehicle speed is greater than or equal to speed V2, the decision outcome of step S230 is negative, and the CPU 31 proceeds to step S250. If the duration that the relative vehicle speed is greater than or equal to V1 and less than V2 (V1≤relative vehicle speed<V2) is less than or equal to the duration T1, the decision outcome of step S240 is negative, and the CPU 31 proceeds to step S250.

At step S250, the CPU 31 judges whether the vehicle-to-vehicle distance between the succeeding vehicle 10k and the autonomous driving vehicle 10 is less than L1. If the vehicle-to-vehicle distance is less than L1, the decision outcome of step S250 is positive, and the CPU 31 proceeds to step S260. At step S260, the CPU 31 judges whether the duration of the state in which the vehicle-to-vehicle distance is less than the distance L1 is greater than a predetermined duration T2. The duration T2 may be greater or less than or the same as the duration T1.

If the duration of the state in which the vehicle-to-vehicle distance is less than the distance L1 is greater than the duration T2, the decision outcome of step S260 is positive, and the CPU 31 proceeds to step S270.

If the vehicle-to-vehicle distance is greater than or equal to L1, the decision outcome of step S250 is negative, and the CPU 31 terminates the second process without tentatively determining the offset amount. If the duration of the state in which the vehicle-to-vehicle distance is less than the distance L1 is less than or equal to T2, the decision outcome of step S260 is negative, and the CPU 31 terminates the second process without tentatively determining the offset amount.

Figure 8:
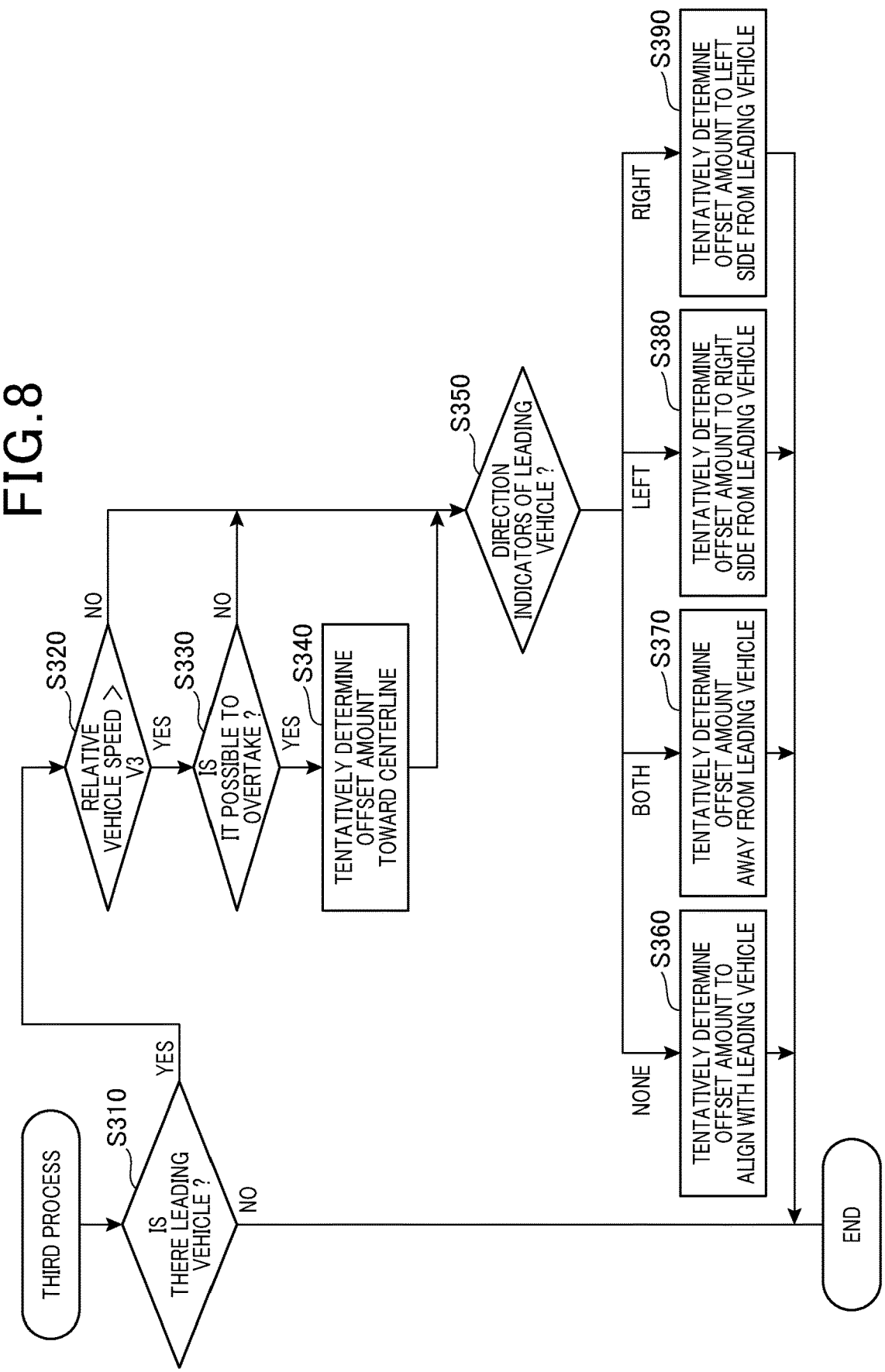
FIG. 8 is a flowchart of a third process related to a leading vehicle.
Figure 9:
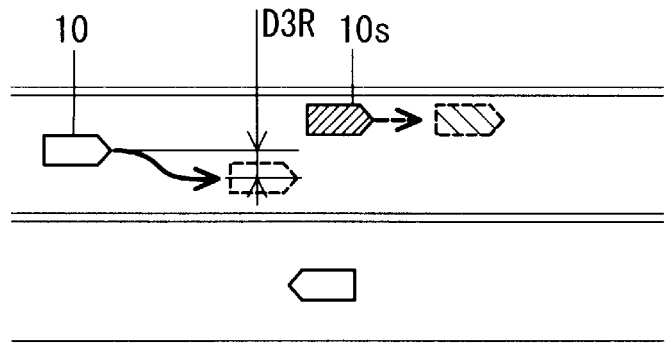
FIG. 9 is an illustration of an offset amount when there is a leading vehicle.
Figure 10:
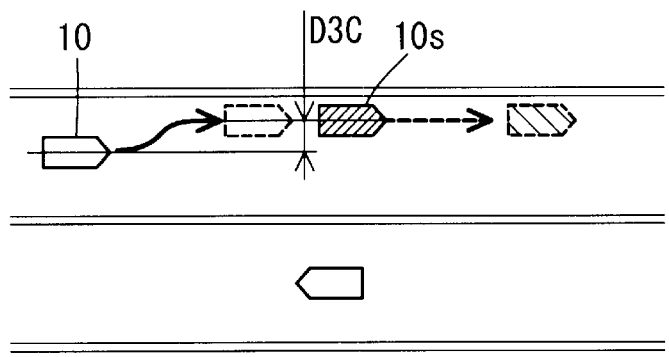
FIG. 10 is an illustration of an offset amount when there is a leading vehicle.

After terminating the second process, the CPU 31 performs a third process as illustrated in FIG. 3. As illustrated in FIG. 8, when the third process is started, the CPU 31 proceeds to step S310 and judges whether a leading vehicle 10s exists. The leading vehicle 10s is illustrated in FIGS. 9 and 10. The leading vehicle 10s is a vehicle traveling ahead of the own vehicle 10, and the distance to the own vehicle 10 is less than a predetermined distance.

In the present embodiment, the presence or absence of the leading vehicle 10s and the vehicle-to-vehicle distance are judged based on the detection result of the detection section 20b.

If no leading vehicle 10s exists, the decision outcome of step S310 is negative, and the CPU 31 terminates the third process. If the leading vehicle 10s exists, the decision outcome of step S310 is positive, and the CPU 31 proceeds to step S320. At step S320, the CPU 31 judges whether the relative vehicle speed with respect to the leading vehicle 10s is greater than a speed V3. The speed V3 is a positive value. That is, if the relative vehicle speed is greater than the speed V3, the vehicle speed of the own vehicle 10 is faster than the vehicle speed of the leading vehicle 10s, and the absolute value of the relative vehicle speed is greater than the absolute value of the speed V3. The leading vehicle 10s may also be stationary.

If the relative vehicle speed with respect to the leading vehicle 10s is greater than the speed V3, the decision outcome of step S320 is positive, and the CPU 31 proceeds to step S330. At step S330, the CPU 31 judges whether there is a space for overtaking the leading vehicle 10s. For example, as illustrated in FIG. 9, if the leading vehicle 10s is traveling at a position closer to the road shoulder, there is a space that allows the overtaking closer to the centerline C, which is the boundary with respect to the opposite lane. At step S330, the presence or absence of such a space is judged. If there is a space for overtaking, the decision outcome of step S330 is positive, and the CPU 31 proceeds to step S340. At step S340, the CPU 31 tentatively determines the distance D3R as the offset amount toward the centerline C so that the traveling position is shifted away from the leading vehicle 10s.

If there is no space for overtaking, the decision outcome of step S330 is negative, and the CPU 31 proceeds to step S350. If the relative vehicle speed with respect to the leading vehicle 10s is less than or equal to the speed V3, the decision outcome of step S320 is negative, and the CPU 31 proceeds to step S350.

At step S350, the CPU 31 judges the blinking state of the direction indicators of the leading vehicle 10s based on the detection result of the detection section 20b.

If the direction indicators are not blinking, the CPU 31 proceeds to step S360, tentatively determines a distance D3C as the offset amount to be located directly behind the leading vehicle 10s as illustrated in FIG. 10, and terminates the third process. Step S360 is performed for the purpose of following the leading vehicle 10s.

If the direction indicators are both blinking, that is, if the hazard lights are on, the CPU 31 proceeds to step S370 and tentatively determines the offset amount away from the leading vehicle 10s. That is, if the traveling position of the leading vehicle 10s is closer to the right side, the offset amount to the left is determined, and if the traveling position of the leading vehicle 10s is closer to the left side, the offset amount to the right is determined.

The specific distance as the offset amount is determined based on the concept of Equation (1) described with reference to FIG. 7. That is, if the leading vehicle 10s is located closer to the centerline C, since the own vehicle 10 needs to move toward the edge line H, the specific distance is determined so that the margin with respect to the edge line H becomes equal to M. If the leading vehicle 10s is located closer to the edge line H, since the own vehicle 10 needs to move closer to the centerline C, the specific distance is determined so that the margin with respect to the centerline C becomes equal to M.

If the left direction indicator is blinking, the CPU 31 proceeds to step S380, tentatively determines the offset amount to the right side, and terminates the third process. The specific distance as the offset amount is the same as that in the case when the own vehicle 10 is shifted to the right side in step S370. Step S380 is performed to move the own vehicle 10 away from the forward direction of the leading vehicle 10s for the purpose of reducing the possibility of bumping into the leading vehicle 10s making a left turn.

If the right direction indicator is blinking, the CPU 31 proceeds to step S390, tentatively determines the offset amount to the left side, and terminates the third process. The specific distance as the offset amount is the same as that in the case when the own vehicle 10 is shifted to the left side in step S370. Step S390 is performed to move the own vehicle away from the forward direction of the leading vehicle 10s for the purpose of reducing the possibility of bumping into the leading vehicle 10s making a right turn.

Figure 11:
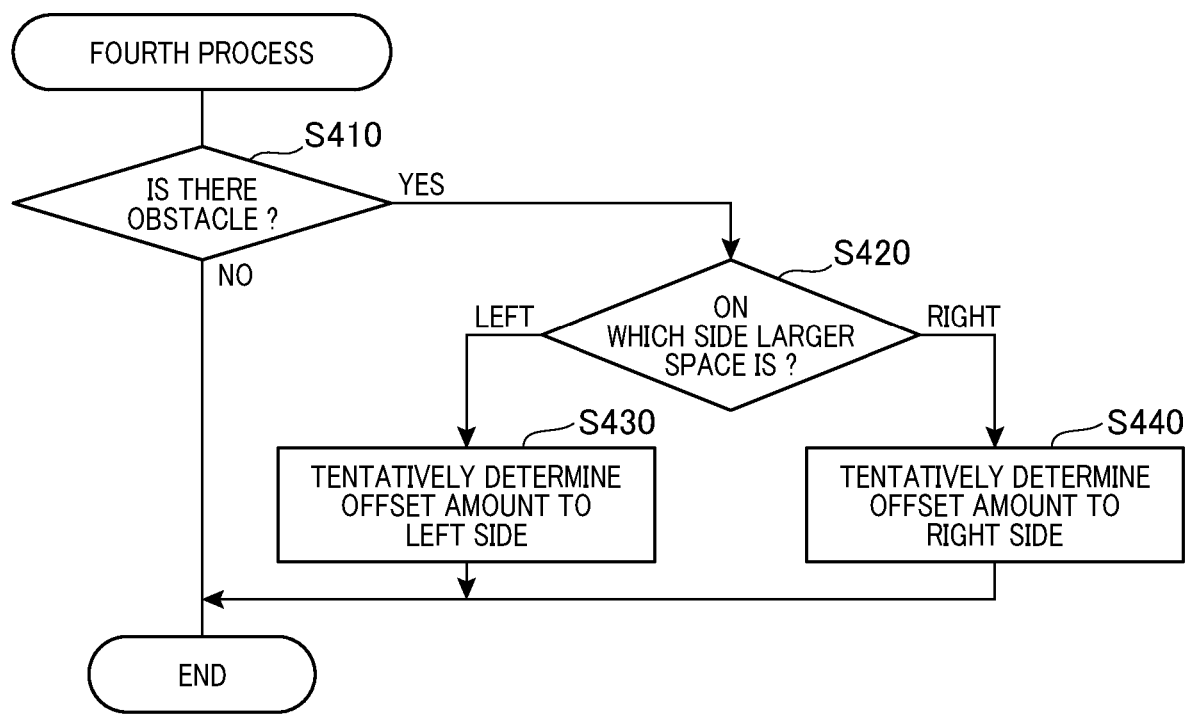
FIG. 11 is a flowchart of a fourth process related to an obstacle.
Figure 12:
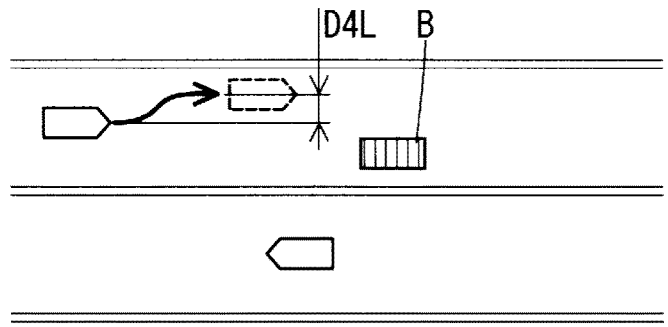
FIG. 12 is an illustration of an offset amount when there is an obstacle.
Figure 13:
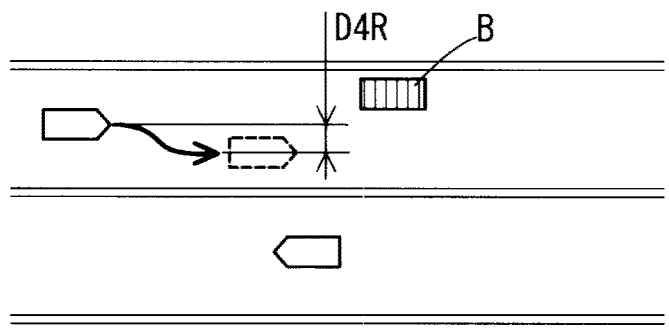
FIG. 13 is an illustration of an offset amount when there is an obstacle.

When the third process is terminated, the CPU 31 performs a fourth process as illustrated in FIG. 2. As illustrated in FIG. 11, when the fourth process is started, the CPU 31 proceeds to step S410 and judges whether an obstacle B exists in the forward direction. The obstacle B is illustrated in FIGS. 12 and 13. The obstacle B is an object that is stationary such as a fallen object and a disabled vehicle.

The presence or absence of the obstacle B is judged based on the detection result of the detection section 20b. If there is no obstacle B, the decision outcome of step S410 is negative, and the CPU 31 terminates the fourth process.

If there is the obstacle B, the decision outcome of step S410 is positive, and the CPU 31 proceeds to step S420. At step S420, the CPU 31 judges whether a larger space not blocked by the obstacle B is on the left side or on the right side. If a larger space is on the left side of the obstacle B, the CPU 31 proceeds to step S430, tentatively determines the offset amount to the left side, and terminates the fourth process. FIG. 12 illustrates a distance D4L as the offset amount to the left side. The distance D4L is also determined based on the same concept as Equation (1). Step S430 and step S440 described later, are performed so that the own vehicle 10 does not come into contact with the obstacle B.

If the space on the right side of the obstacle B is larger, the CPU 31 proceeds to step S440, tentatively determines the offset amount to the right side, and terminates the fourth process. FIG. 13 illustrates a distance D4R as the offset amount to the right side. The distance D4R is also determined based on the same concept as Equation (1).

Figure 14:
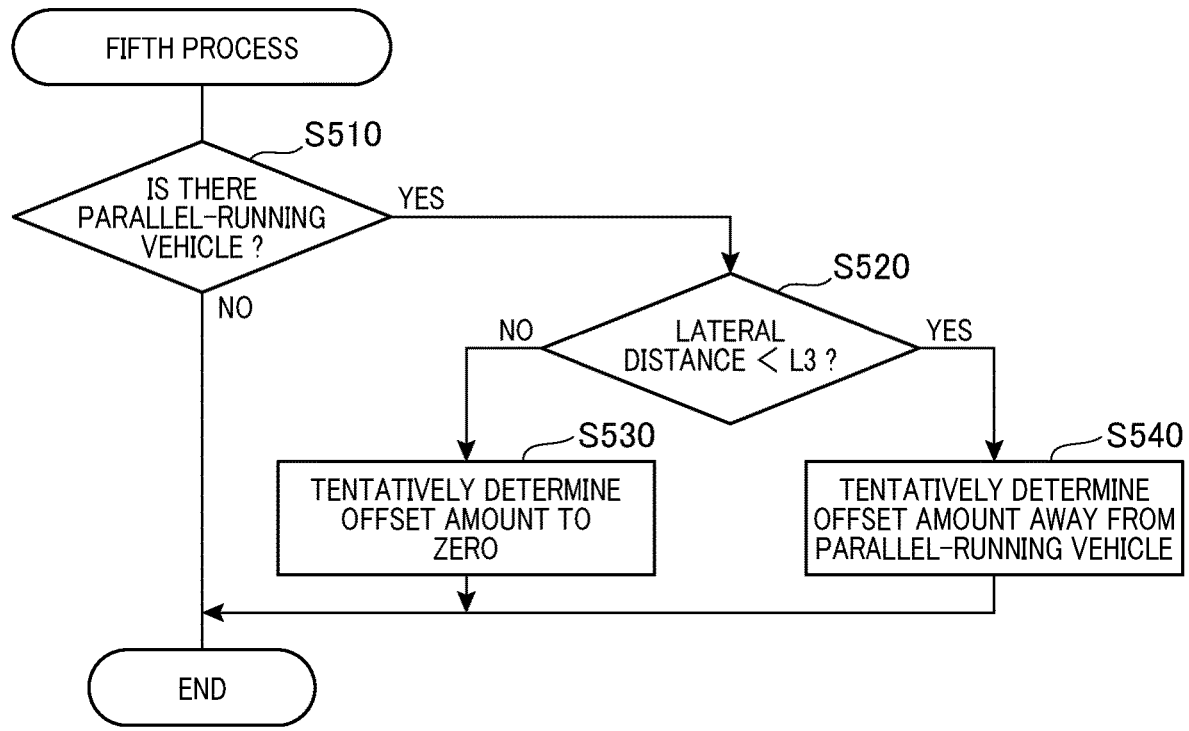
FIG. 14 is a flowchart of a fifth process related to a parallel-running vehicle.
Figure 15:
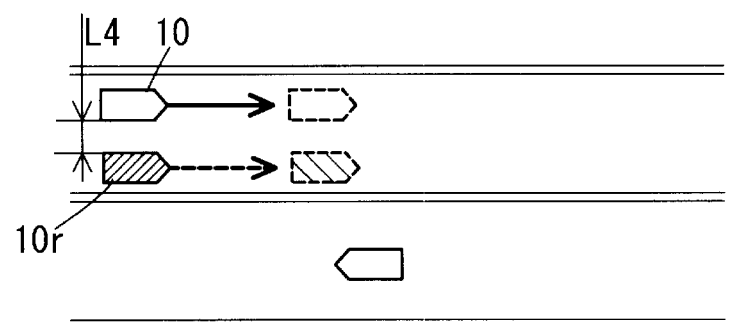
FIG. 15 is an illustration of an offset amount when there is a parallel-running vehicle.
Figure 16:
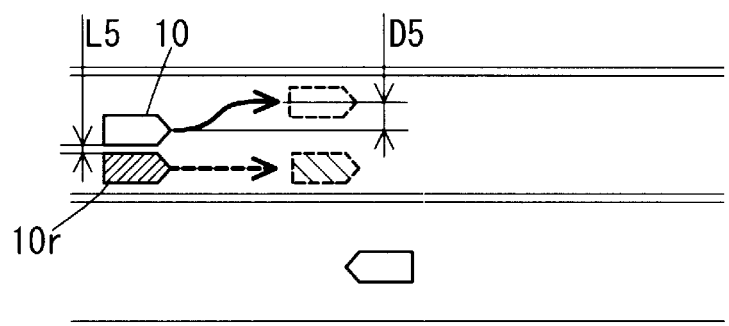
FIG. 16 is an illustration of an offset amount when there is a parallel-running vehicle.

After the fourth process is terminated, the CPU 31 performs a fifth process as illustrated in FIG. 3. As illustrated in FIG. 14, when the fifth process is started, the CPU 31 proceeds to step S510 and judges whether there is a parallel-running vehicle 10r. The parallel-running vehicle 10r is illustrated in FIGS. 15 and 16. The parallel-running vehicle 10r is a vehicle that travels on the same lane as the own vehicle 10 and at least part of the vehicle body of which overlaps the vehicle body of the own vehicle 10 in the fore-and-aft direction when the vehicle is viewed from the side.

If no parallel-running vehicle 10r exists, the decision outcome of step S510 is negative, and the CPU 31 terminates the fifth process. If the parallel-running vehicle 10r exists, the decision outcome of step S510 is positive, and the CPU 31 judges whether the lateral distance is less than a distance L3. The lateral distance refers to the distance to the parallel-running vehicle 10r. The distance L3 is previously determined. The lateral distance is judged based on the detection result of the detection section 20b.

If the lateral distance is greater than or equal to the distance L3, the decision outcome of step S520 is negative, and the CPU 31 proceeds to step S530. At step S530, the CPU 31 tentatively determines the offset amount as zero and terminates the fifth process. FIG. 15 illustrates a case in which the lateral distance is a distance L4. The distance L4 is greater than the distance L3. Thus, FIG. 15 illustrates a situation in which the offset amount is tentatively determined to be zero.

If the lateral distance is less than the distance L3, the decision outcome of step S520 is positive, and the CPU 31 proceeds to step S540. At step S540, the CPU 31 tentatively determines the offset amount in a direction away from the parallel-running vehicle 10r and terminates the fifth process. The offset amount illustrated in FIG. 16, which is a specific distance D5, is determined based on the same concept as Equation (1) described with reference to FIG. 7.

After the fifth process is terminated, the CPU 31 proceeds to step S600 as illustrated in FIG. 2 and makes a final determination on the offset amount. For example, if the number of the tentatively determined offset amount is one, the offset amount becomes a final determination without being changed.

If there is more than one tentatively determined offset amount, the CPU 31 makes a final determination on the offset amount by integration using, for example, a function with the weight given to each offset amount. For example, the offset amount that significantly affects safety is given a higher weight. For example, step S430 and step S440 of the fourth process and step S540 of the fifth process are given a higher weight than step S130, step S140, and step S150 of the first process. For example, when the offset amount toward the right side from the center of the lane is tentatively determined at step S150, and the offset amount toward the left side is tentatively determined at step S430, the offset amount finally determined at step S600 is substantially the same value as the offset amount tentatively determined at step S430.

According to the present embodiment as described above, the traveling position is determined in a suitable manner during traveling on a road where the width of one lane corresponds to that of two lanes.

The correspondence between the embodiments and claims will be described. The judgment section 31a is responsible for execution of steps S110, S210, S310, S410, and S510. The determination section 31b is responsible for execution of steps S130, S140, S150, S270, S360, S370, S380, S390, S430, S440, S530, S540, and S600.

The present disclosure is not limited to the embodiments of this description and may be embodied in various forms without departing from the scope of the disclosure. For example, the technical feature of the embodiment that corresponds to the technical feature of each aspect described in Summary of the Invention may be replaced or combined as required for solving some or all of the above problems or for achieving some or all of the above advantages. Unless the technical feature is described as essential in the description, the technical feature may be eliminated as required. For example, the present disclosure is exemplified by the following embodiments.

In the embodiment described above, the database is stored by the autonomous driving vehicle. In an alternative embodiment, for example, the autonomous driving vehicle may request the external device as required, and the external device may transmit the database in response to the request. When the database is transmitted and received in response to the request as above, the database of only the vicinity of the current location of the autonomous driving vehicle needs to be transmitted and received. This reduces the amount of data transmitted and received.

In the embodiment described above, the reference position is the center of the lane. In an alternative embodiment, for example, the position slightly closer to the edge than the center may be the reference position.

The details of the above-described embodiment may be used in applications other than the road having a width corresponding to the width of substantially two lanes. For example, the details of the embodiment may be applied to a case when another vehicle is a two-wheeled vehicle in a lane having a width of one typical lane.

In the above-described embodiment, some or all of the functions and processes achieved by software may be achieved by hardware. Some or all of the functions and processes achieved by hardware may be achieved by software. Hardware may include various circuits such as an integrated circuit, a discrete circuit, or a circuit module that combines these circuits.

What is claimed is:

1. An apparatus coupled to autonomous driving vehicles for determining a traveling position of an own vehicle which is an autonomous driving vehicle, the traveling position being a widthwise position within a lane in which the own vehicle is traveling, the apparatus comprising:
    a non-transitory memory storing one or more computer programs; and
    a processor executing the one or more programs to:
    determine a presence or absence of a travel history of other vehicles regarding the lane in which the own vehicle is traveling, the travel history being acquired from an external device that collects and manages the travel history of the other vehicles;
    determine a presence or absence of an object detected by a detection unit and located in a vicinity of the own vehicle within the lane in which the own vehicle is traveling and should be avoided coming into contact with;
    for a state in which the travel history and the object are determined to exist, determine the traveling position of the own vehicle using the travel history of the other vehicles and using position information of the object acquired from the detection unit; and
    perform traveling control of the own vehicle based on the determined traveling position of the own vehicle.

2. The apparatus according to claim 1, wherein
the travel history is classified per traveling path, and
the processor, in response to determining that the travel history exists, use the travel history corresponding to a planned traveling path of the own vehicle.

3. The apparatus according to claim 1, wherein
the processor, in response to the object being a succeeding vehicle, determines the traveling position to approach a road shoulder.

4. The apparatus according to claim 1, wherein
the processor, in response to the object being a leading vehicle followed by the own vehicle, determines the traveling position to approach the traveling position of the leading vehicle.

5. The apparatus according to claim 1, wherein
the processor, in response to the object being a leading vehicle and the own vehicle attempting to overtake the leading vehicle, determines the traveling position to be shifted away from the traveling position of the leading vehicle.

6. The apparatus according to claim 1, wherein
the processor, in response to the object being a leading vehicle whose direction indicator is blinking, determines the traveling position to be shifted away from a forward direction of the leading vehicle indicated by the direction indicator.

7. The apparatus according to claim 1, wherein
the processor, in response to the object being an obstacle, determines the traveling position so as not to come into contact with the obstacle.

8. The apparatus according to claim 1, wherein
the processor, in response to the object being a vehicle that travels alongside the own vehicle within the same lane, determines the traveling position to be shifted away from the traveling position of the vehicle traveling alongside.

9. The apparatus according to claim 1, wherein
the processor, in response to determining that the travel history exists and the object exists, determines the traveling position by integrating the traveling position determined based on the travel history and the traveling position determined based on the position information of the object.

10. A computer-implemented method for autonomous driving vehicles to determine a traveling position of an own vehicle which is an autonomous driving vehicle, the traveling position being a widthwise position within a lane in which the own vehicle is traveling, comprising:
    determining a presence or absence of a travel history of other vehicles regarding the lane in which the own vehicle is traveling, the travel history being acquired from an external device that collects and manages the travel history of the other vehicles; and
    determine presence or absence of an object detected by a detection unit and located in the vicinity of the own vehicle within the lane in which the own vehicle is traveling and should be avoided coming into contact with;
    for a state in which the travel history and the object are determined to exist, determining the traveling position of the own vehicle using the travel history of the other vehicles and using position information of the object acquired from the detection unit; and
    perform traveling control of the own vehicle based on the determined traveling position of the own vehicle.

* * * * *